(12) United States Patent
Wears et al.

(10) Patent No.: US 8,122,908 B2
(45) Date of Patent: Feb. 28, 2012

(54) THREE-WAY VALVE WITH FLOW DIVERTER

(75) Inventors: William E. Wears, Marshalltown, IA (US); Daniel M. Adams, Marshalltown, IA (US); Ross A. Schade, Ames, IA (US); David G. Halm, Haverhill, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 945 days.

(21) Appl. No.: 12/034,117

(22) Filed: Feb. 20, 2008

(65) Prior Publication Data
US 2009/0205729 A1    Aug. 20, 2009

(51) Int. Cl.
*F16K 11/044* (2006.01)
(52) U.S. Cl. .................. 137/625.48; 251/118
(58) Field of Classification Search ............ 137/625.33, 137/625.38, 625.48, 625.5; 251/118
See application file for complete search history.

(56) References Cited

U.S. PATENT DOCUMENTS

| | | | | |
|---|---|---|---|---|
| 2,897,836 A * | 8/1959 | Peters et al. | ............... | 137/454.5 |
| 2,915,087 A * | 12/1959 | Kruschik | ................. | 137/625.37 |
| 3,188,048 A * | 6/1965 | Sutherland | .................... | 277/532 |
| 3,548,874 A * | 12/1970 | Parks | .......................... | 137/625.5 |
| 3,606,911 A * | 9/1971 | Keith | ............................. | 37/269 |
| 3,635,247 A * | 1/1972 | Myers | ....................... | 137/625.5 |
| 3,730,224 A * | 5/1973 | Prisk | ........................ | 137/625.33 |
| 3,771,562 A * | 11/1973 | Curran | ....................... | 137/625.4 |
| 3,774,638 A * | 11/1973 | Kriett | ....................... | 137/625.48 |
| 3,776,278 A * | 12/1973 | Allen | ....................... | 137/625.38 |
| 3,813,079 A * | 5/1974 | Baumann et al. | ............ | 251/127 |
| 4,154,263 A * | 5/1979 | Cary | .......................... | 137/625.3 |
| 4,506,860 A * | 3/1985 | von Schwerdtner et al. | . | 251/124 |
| 4,621,656 A | 11/1986 | Ichimaru | | |
| 4,688,755 A * | 8/1987 | Pluviose | ....................... | 251/121 |
| 5,924,673 A * | 7/1999 | Welker | .......................... | 251/118 |
| 6,003,551 A * | 12/1999 | Wears | ....................... | 137/625.33 |
| 6,105,614 A * | 8/2000 | Bohaychuk et al. | ........ | 137/625.3 |
| 6,935,371 B2 * | 8/2005 | Stares | ....................... | 137/625.37 |
| 6,974,121 B2 | 12/2005 | Koester et al. | | |
| 7,028,712 B2 * | 4/2006 | Wears et al. | ............. | 137/625.33 |
| 7,159,617 B2 * | 1/2007 | Erickson et al. | ......... | 137/625.38 |

(Continued)

FOREIGN PATENT DOCUMENTS

CN        86208469 U       11/1987

(Continued)

OTHER PUBLICATIONS

Samson, "Series 3240, Three-way Control Valve Type 3244, Pneumatic Control Valves Type 3244/3271 and 3244/3277," Technical Data Sheet T 8026 (1996).

(Continued)

*Primary Examiner* — John Fox
(74) *Attorney, Agent, or Firm* — Marshall, Gerstein & Borun LLP

(57) ABSTRACT

A three-way valve body comprises a throat defining a generally cylindrical throat cavity. At least one flow diverter is carried by the valve body and extends into the throat cavity. The flow diverter advantageously interrupts any circulatory fluid flow within the throat cavity, thereby increasing the efficiency at which fluid flows through the valve body. In one embodiment, the at least one flow diverter can comprise one or more ribs integrally formed with the valve body and disposed parallel to a central axis of the throat cavity.

23 Claims, 4 Drawing Sheets

U.S. PATENT DOCUMENTS 7,426,938 B2 * 9/2008 Bohaychuk et al. ..... 137/625.33

FOREIGN PATENT DOCUMENTS

| EP | 1 406 035 A1 | 4/2004 |
| --- | --- | --- |
| FR | 1 404 106 | 12/1965 |
| GB | 1 517 805 A | 7/1978 |

OTHER PUBLICATIONS

Image, "Angle Valve Body Assemblies," Fisher® Governor Co., 1961 (1 page).

Image, "Steel as Specified, Patt CLE, Size 2, Design EH, Valve Body Cstg.," © Fisher Controls, 1988 (1 page).

Image, "Steel as Specified Patt CLF, Size 3, Design EH, Valve Body Cstg" © Fisher Controls, 1998 (2 pages).

Image, "Steel as Specified Patt CLJ, Size 2, Design EH, Valve Body Cstg.," © Fisher Controls, 1982, 1988 (1 page).

Image, "Patt CLL, Size 4, Design EH, Valve Body Cstg.," © Fisher Controls, 1988, 1991 (2 pages).

Image, "Steel as Specified Patt No. GMH, Size 16, Design E, Valve Body Casting," © Fisher Controls, 1989 (2 pages).

Image, "Steel as Specified Patt No. GMZ, Size 12, Design E, Valve Body Casting" © Fisher Controls, 1989 (2 pages).

Image, "Steel as Specified Patt No. GNX, Size 10, Design E, Valve Body Casting," © Fisher Controls, 1989 (2 pages).

International Search Report for PCT/US2009/030484, mailed May 19, 2009.

First Office Action for Chinese Application No. 200980105718.4, dated Sep. 15, 2011.

* cited by examiner ns, a rear wall portion, and an opening. So configured, in one embodiment, the throat defines a generally cylindrical throat cavity disposed along a central axis.

THREE-WAY VALVE WITH FLOW DIVERTER

FIELD OF THE DISCLOSURE

The present invention generally relates to three-way valves, and more particularly, to valve bodies for three-way valves.

BACKGROUND

It is generally understood that in certain process applications more than two pipelines are sometimes connected for flow-mixing or flow-splitting applications. For example, three pipelines can be connected to provide a generally converging (flow-mixing) or diverging (flow-splitting) service. In such applications, a three-way valve may be used to control the various converging or diverging fluid flows. Generally, three-way valves have three flow connections or ports. In mixing applications, two of the flow connections are inlets and one is an outlet. In splitting applications, one flow connection is an inlet and two are outlets.

The efficiency at which the diverging or converging fluid flows through the valve affects the quality of the final product being output from the valve. Accordingly, for any given fluid process application, such three-way valves are carefully selected to optimize the efficiency at which the final product or products are generated based on the particular fluids or other mediums being processed, the temperature and pressure conditions of the process, and many other factors.

SUMMARY

One embodiment of the present invention comprises a three-way valve body defining a fluid flow path therethrough. The valve body comprises a first port, a second port, and a third port, each of which is in fluid communication with the flow path. The valve body further comprises a throat and at least one flow diverter. The throat is disposed between and in fluid communication with each of the first through third ports and comprises a pair of opposing side wall portions, a rear wall portion, and an opening. So configured, in one embodiment, the throat defines a generally cylindrical throat cavity disposed along a central axis.

The at least one flow diverter can be carried by the valve body to extend into the throat cavity. So disposed, the flow diverter interrupts the flow of fluid along the flow path and in the throat cavity.

In at least one embodiment, the at least one flow diverter can comprise at least one rib disposed parallel to the central axis of the throat cavity.

Another embodiment of the present invention provides a three-way fluid flow control device. The device generally comprises a valve body, a control element, and a valve seat. The valve body defines a flow path for accommodating one of a converging or a diverging fluid flow. The control element comprises a valve stem and a valve plug disposed within the valve body and is adapted to be moved between a first seated position and a second seated position for controlling the flow of fluid along the flow path. The valve seat is carried within the valve body and adapted to be sealingly engaged by the valve plug when the control element is in the first seated position. In one embodiment, the valve body defines a first port, a second port, and a third port, each of which is in fluid communication with the flow path. Moreover, the valve body of one embodiment includes a throat and at least one flow diverter carried by the throat.

The throat is generally disposed between and in fluid communication with each of the first through third ports and defines a generally cylindrical throat cavity disposed along a central axis. The throat cavity at least partly accommodates the control element.

The at least one flow diverter can extend into the throat cavity to interrupt the flow of fluid along the flow path and in the throat cavity.

In one embodiment, the at least one flow diverter comprises a first rib and/or a pair of second ribs. The first rib can be carried by the rear wall portion of the throat and be disposed substantially parallel to the central axis of the throat cavity. Each of the pair of second ribs can be carried by one of the opposing sidewall portions of the throat and be disposed substantially parallel to the central axis of the throat cavity.

DETAILED DESCRIPTION

Figure 1:
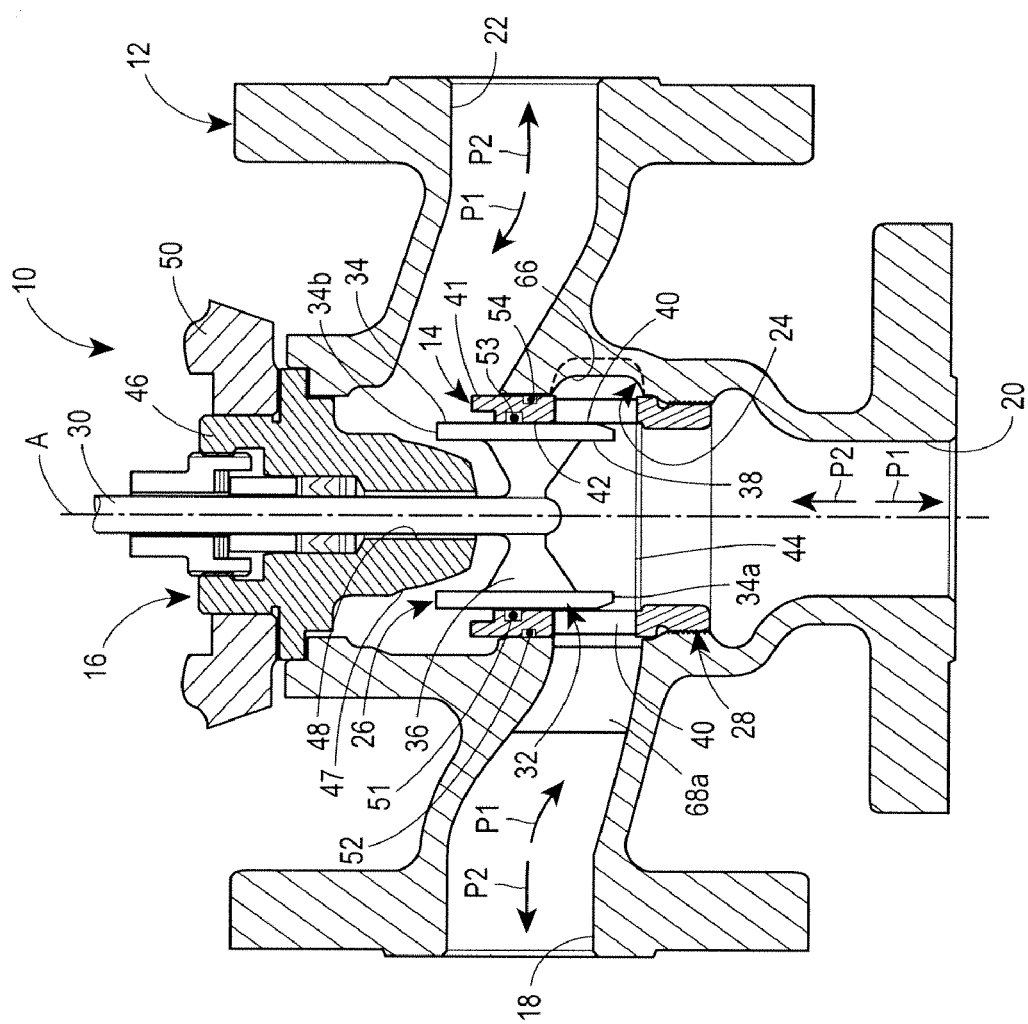
FIG. 1 is a cross-sectional side view of a three-way valve constructed in accordance with the principles of the present invention and including a valve body outfitted with a balanced valve trim assembly.

FIG. 1 depicts a balanced three-way control valve 10 that may be used in either a converging or a diverging flow application comprising a valve body 12, a trim assembly 14, and a bonnet 16. Generally, the valve body 12 includes a first port 18, a second port 20, a third port 22, and throat 24. In the disclosed embodiment, the trim assembly 14 includes a balanced trim assembly for controlling the flow of fluid through the valve body 12. In the case of the valve 10 serving a converging application, flow path P1 illustrates that the first and third ports 18, 22 are inlet ports and the second port 20 is a common outlet port. In the case of the valve 10 serving a diverging application, flow path P2 illustrates the second port 20 is an inlet port and the first and third ports 18, 22 are outlet ports. The disclosed embodiment defines the three-way control valve 10 as a "bottom port common" valve. In either configuration, the trim assembly 14 generally functions the same.

The trim assembly 14 of the disclosed balanced configuration comprises a control element 26 and a cage 28. The cage 28 is fixedly mounted within the throat 24 of the valve body 12 and generally includes a tubular member 41 defining a plurality of windows 40, an inner cylindrical surface 42, and a lower valve seat 44.

The control element 26 comprises a valve stem 30 and a valve plug 32. The valve plug 32 includes a tubular member 34 and a plurality of webs 36. The tubular member 34 includes a first end 34a, a second end 34b, an inner cylindrical surface 38, and an outer cylindrical surface 40. The plurality of webs 36 extend between and connect the inner cylindrical surface 38 of the tubular member 34 and the valve stem 30. The webs 36 are spaced circumferentially about the valve stem 30 and the inner cylindrical surface 38 of the tubular member 34, thereby defining a plurality of openings that enable fluid to flow between the first and second ends 34a, 34b of the valve plug 32.

As illustrated, the valve plug 32 is slidably disposed within the valve cage 28 such that the inner cylindrical surface 42 of the cage 28 guides the outer cylindrical surface 40 of the tubular member 34 of the valve plug 32. The cage 28 therefore assists in maintaining the alignment of the control element 26 relative to the valve body 12, for example. A first fluid seal is formed between the cage 28 and the valve body 12 with a first annular seal 52, such as an o-ring seal, disposed within an outer annular recess 54 of the cage 28. A second fluid seal is formed between the cage 28 and the valve plug 32 by a second annular seal 51, such as an o-ring seal, disposed within an inner annular recess 53 of the cage 28.

The bonnet 16 also assists in maintaining the alignment of the control element 26. Specifically, as illustrated, the bonnet 16 includes a body 46 that defines a through bore 48. The through-bore 48 slidably accommodates the valve stem 30 of the control element 26. The bonnet 16 may be secured to the valve body 12 by a flange 50 or part of an actuator bonnet that may threadably receive fasteners (not shown) within the valve body 12. The body 46 of the presently disclosed embodiment of the bonnet 16 includes a cross-sectional shape that is substantially parabolic, which serves to direct the flow of fluid along either of the flow paths P1, P2 described above.

It should be appreciated that the specific embodiments of the balanced trim assembly 14 and bonnet 16 described herein are merely examples, and that alternative embodiments can include alternative components. For example, in one alternative embodiment, the bonnet 16 and/or the control element 26 can resemble one or more of the bonnets and/or control elements disclosed in commonly owned U.S. patent application Ser. No. 11/470,029, filed Sep. 5, 2006 and entitled "Parabolic Bonnet for Three-Way Valve," the entire contents of which are expressly incorporated herein by reference.

Figure 2:
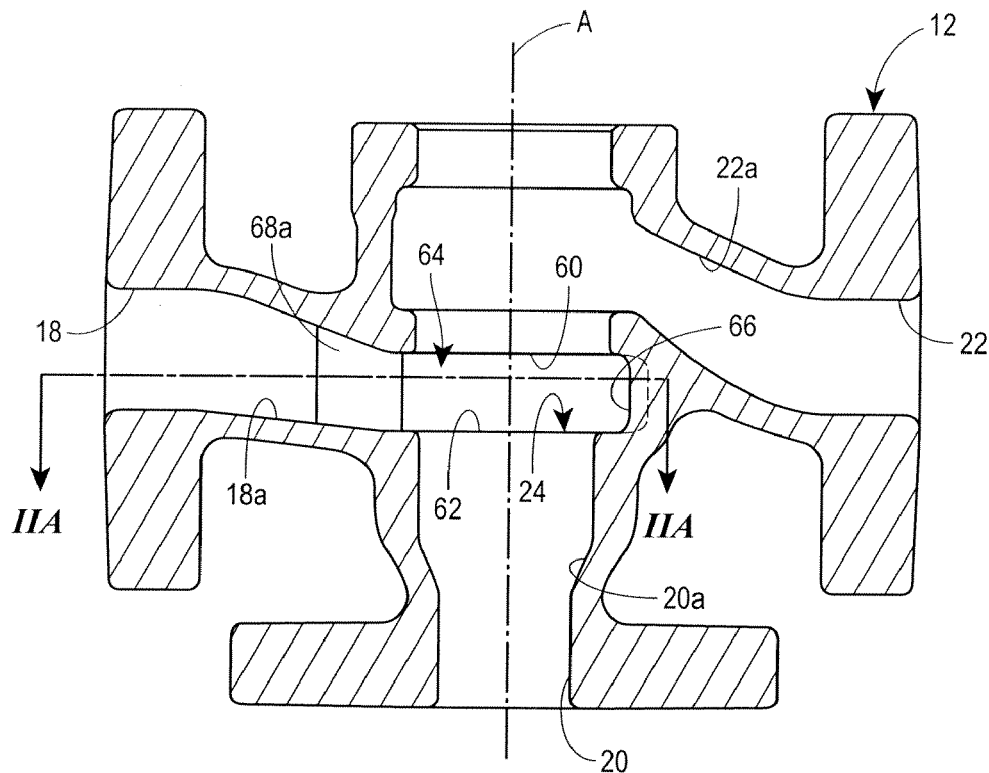
FIG. 2 is a cross-sectional side view of only the valve body of FIG. 1.
Figure 2A:
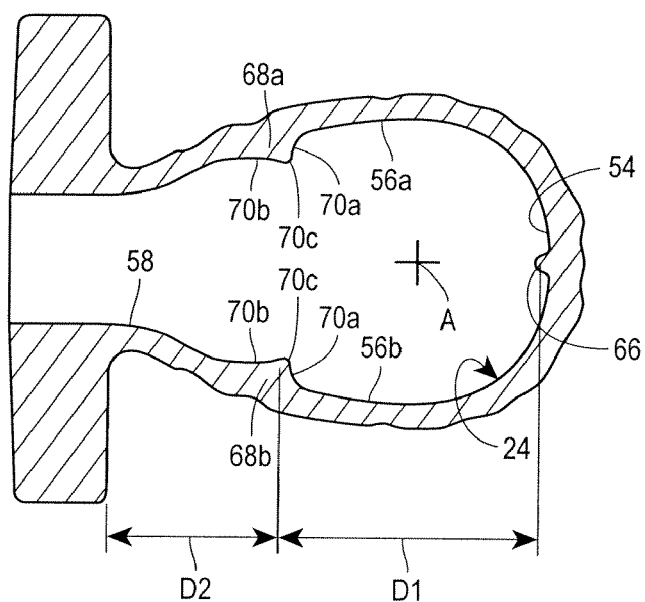
FIG. 2A is a complete cross-sectional side view of the valve body of FIGS. 1 and 2, as if taken through line IIA-IIA of FIG. 2.

Referring now to FIGS. 2 and 2A, the valve body 12 of the presently disclosed embodiment of the present invention will be described. FIG. 2 depicts the valve body 12 of FIG. 1 with the trim assembly 14 and bonnet 16 removed.

As mentioned, the valve body 12 includes a first port 18, a second port 20, a third port 22, and a throat 24. Additionally, the valve body 12 comprises a first conduit 18a extending between the first port 18 and the throat 24, a second conduit 20a extending between the second port 20 and the throat 24, and a third conduit 22a extending between the third port 22 and the throat 24. Each of the first through third conduits 18a, 20a, 22a comprise passageways for enabling fluid to flow through the valve body 12.

As depicted in FIG. 2A, the throat 24 includes a cross-section shaped like an eccentric oval. For the sake of description, the throat 24 includes a rear wall portion 54 and first and second opposing sidewall portions 56a, 56b that define an opening 58. Additionally, as depicted in FIG. 2, the throat 24 includes an upper wall portion 60 and a lower wall portion 62. The upper wall portion 60 is disposed between the throat 24 and the third conduit 22a. The lower wall portion 62 is disposed between the throat 24 and the second conduit 22a. So configured, the throat 24 defines a throat cavity 64. The throat cavity 64 is defined as the space between the rear wall portion 54, the sidewall portions 56a, 56b, the opening 58, the top wall portion 60, and the bottom wall portion 62. Accordingly, in the disclosed embodiment of the valve body 12, the throat cavity 64 is a cylinder or generally cylindrical space with the above-described eccentric oval cross-section having a central axis A. As used herein, a cylinder or cylindrical space can comprise any geometrical form, and is not necessarily limited to a circular cylinder, a right cylinder, or a cylinder having any particular cross-section. Therefore, in alternative embodiments, the throat cavity 64 can have a cross-section other than an eccentric oval such as circular, elliptical, or otherwise.

As is also illustrated in FIGS. 2 and 2A, the throat 24 of the disclosed embodiment of the valve body 12 further includes a rear rib 66 and a pair of side ribs 68a, 68b. The rear rib 66 is disposed on the rear wall portion 54 of the throat 24. The first side rib 68a is disposed on the first sidewall portion 56a of the throat 24, and the second side rib 68b is disposed on the second sidewall portion 56b of the throat 24. In the disclosed embodiment, the first and second side ribs 68a, 68b are disposed closer to the opening 58 in the throat than to the rear rib 66. For example, in the disclosed embodiment, the first and second ribs 68a, 68b are disposed a first distance D1 from the rear rib 66 and a second distance D2 from the opening 58, wherein the first distance D1 is greater than the second distance D2, as illustrated in FIG. 2A.

The rear rib 66 and the side ribs 68a, 68b each include an elongated rib that is disposed substantially parallel to the central axis A of the throat cavity 64 and extending into the throat cavity 64 and generally toward the central axis A. The rear rib 66 includes a generally convex cross-section. The side ribs 68a, 68b each include a generally triangular-shaped cross-section. Specifically, in the disclosed embodiment, each of the side ribs 68a, 68b includes a first side surface 70a, a second side surface 70b, and an apex 70c. In the disclosed embodiment, each of the first and second side surfaces 70a, 70b of the side ribs 68a, 68b includes a concave cross-section, which can also be referred to as a profile, and the apex 70c includes a convex cross-section, which can also be referred to as a profile.

During operation, the valve 10 depicted in FIG. 1 accommodates either a converging fluid flow along flow path P1, or a diverging fluid flow along flow path P2. In either configuration, the control element 26 of the trim assembly 14 is movable between a first seated position, where the first end 34a of the tubular member 34 sealingly engages the lower valve seat 44, and a second seated position, where the second end 34b of the tubular member 34 sealingly engages a second seat 47 formed on the body 46 of the bonnet 16. During operation, the control element 26 can be maintained in a position between the first and second seated positions. Nevertheless, fluid traveling through the valve body 12 must pass through the throat cavity 64 defined by the throat 24. As fluid enters the throat cavity 64, the cylindrical geometry of the throat cavity 64 coupled with the pressure at which the fluid travels through the valve 10, can cause the fluid to circulate about the central axis A. Such circulation can affect the flow efficiency of the valve by limiting its flow capacity. It should be appreciated that circulation flows may create fluid boundary regions within a fluid flow cavity, similar to laminar flow, that may substantially inhibit maximum fluid flow within the fluid flow cavity, which thereby decrease flow capacity and therefore flow efficiency.

In the embodiment of the valve body 12 disclosed in FIGS. 1, 2, and 2A, however, the circulation of the fluid is diverted or disturbed by the rear rib 66 and the side ribs 68a, 68b. For example, as fluid enters the throat cavity 64, the fluid naturally begins to circulate, but instead the circulation is interrupted by the ribs 66, 68a, 68b and the fluid is re-directed toward the central axis A and out of the throat cavity 64 towards its final destination. The turbulence created by the rear rib 66 and the side ribs 68a substantially eliminates the circulation flow within the throat cavity 64. Accordingly, a valve body 12 constructed in accordance with that described herein can advantageously disturb fluid flow through the valve body 12, thereby reducing circulation flow in the throat cavity 64, and increasing the overall efficiency of the valve 10.

While the throat 24 of the valve body 12 has thus far been described as including both the rear rib 66 and the side ribs 68a, 68b, an alternative embodiment of the valve body 12 can include only the rear rib 66, or only one or both of the side ribs 68a, 68b. One of ordinary skill in the art can appreciate that such flow diverters may be cast in the valve body or may be included by a secondary operation using an insert and machining and welding or the like.

While the valve body 12 has been disclosed thus far as being outfitted with the balanced valve trim 14 and bonnet 16 depicted in FIG. 1, another aspect of the valve body 12 disclosed herein is that it may equally be outfitted with an unbalanced trim assembly.

Figure 3:
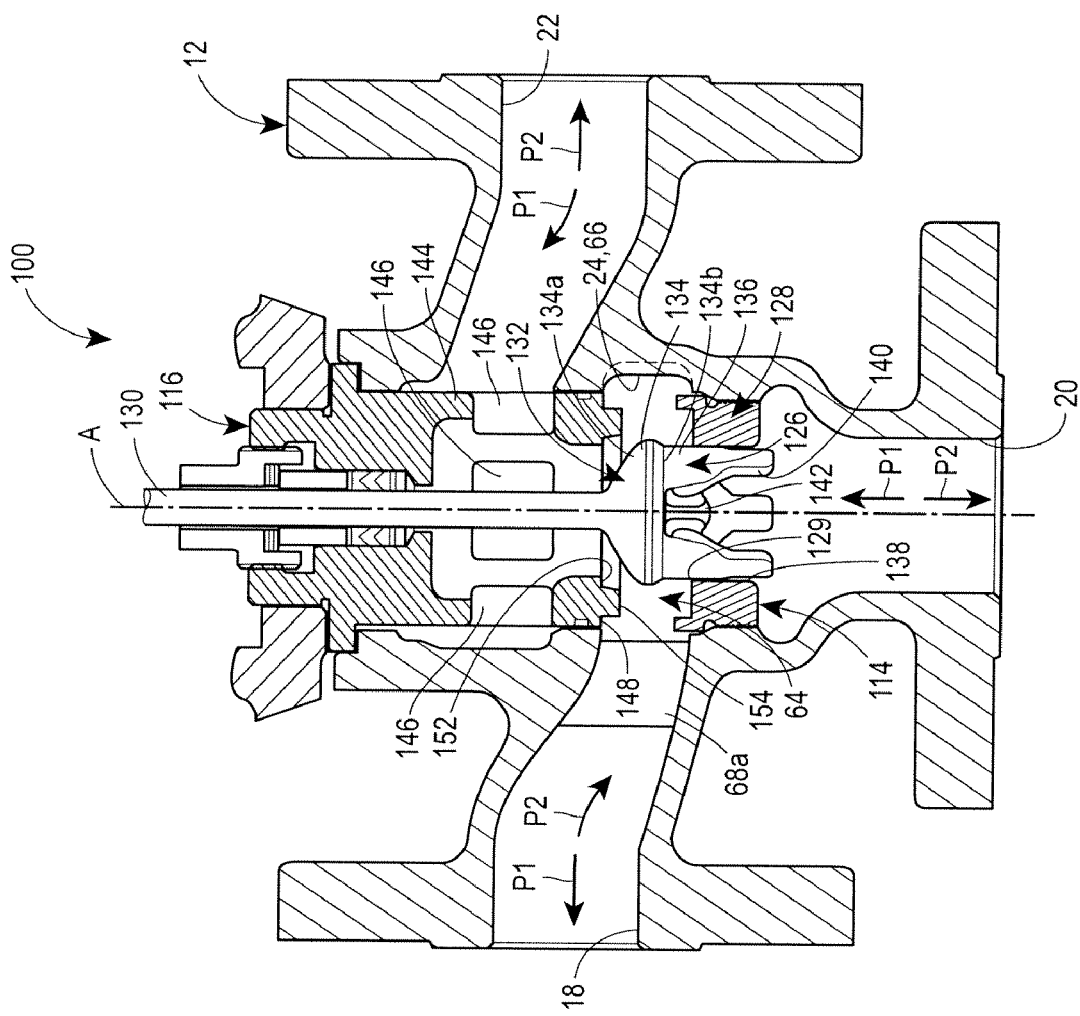
FIG. 3 is a cross-sectional side view of a three-way valve constructed in accordance with the principles of the present invention and including a valve body outfitted with an unbalanced valve trim assembly.

For example, FIG. 3 illustrates an alternative valve 100 that includes the same valve body 12 as is depicted in FIG. 1, but it is outfitted with an unbalanced trim assembly 114 and bonnet 116. For example, when the valve 100 serves a converging application, the second and third ports 20, 22 may be the inlet ports and the first port 18 may be the outlet port. The convergent flow path for this application is illustrated with reference numeral P1 in FIG. 3. Alternatively, when the valve 100 serves a diverging application, the first port 18 is the only inlet port and the second and third ports 20, 22 are both outlet ports. The divergent flow path for the side port common application is illustrated with reference numeral P2 in FIG. 3. The disclosed embodiment defines the three-way control valve 100 as a "side port common" valve.

It should be appreciated that the ability of the valve body 12 to accommodate both a balanced trim assembly in a bottom port common valve and an unbalanced trim assembly in a side port common valve greatly increases the versatility of the valve body 12 in that consumers may be able to switch an existing valve from one to the other simply by replacing the trim assembly as opposed to having to replace the valve body 12 as well. Replacing the entire valve body 12 can be costly and time-consuming because the valve body is often secured within the fluid process control system and not easily removed and transported.

Still referring to FIG. 3, the unbalanced trim assembly 114 generally comprises a control element 126 and a seat ring 128. The seat ring 128 is fixed within the throat 24 of the valve body 12 and defines an opening 138 and a seating surface 129. The control element 126 comprises a valve stem 130 and a valve plug 132. The valve plug 132 includes a cap 134 and a tubular member 136. The cap 134 is a solid cap and defines an upper surface 134a and a bottom surface 134b. As depicted in FIG. 3, the upper surface 134a of the disclosed embodiment of the cap 134 includes a cross-section that is generally parabolic. The tubular member 136 extends from the bottom surface 134b of the cap 134 and extends through the opening 138 in the seat ring 128. Additionally, in the disclosed embodiment of the valve plug 132, the tubular member 134 defines a plurality of windows 140 and a central protrusion 142. The windows 140 allow fluid to flow through the tubular member 134. The protrusion 142 directs the flow of fluid through the tubular member 134. In one embodiment, the control element 126 can include one of the control elements disclosed in commonly owned U.S. Pat. No. 7,028,712, issued Apr. 18, 2006 and entitled "Skirt Guided Globe Valve" or in commonly owned U.S. patent application Ser. No. 11/469,047, filed Aug. 31, 2006 and entitled "Improved Flow for Port Guided Globe Valve," the entire contents of each of which are expressly incorporated herein by reference.

Still referring to FIG. 3, the bonnet 116 of the valve 100 is clamped to the valve body 12 with a flange 150, for example, and includes a cage portion 144 that extends into the valve body 12. The cage portion 144 of the bonnet 116 is generally cylindrical and defines a plurality of windows 146 for allowing fluid to pass therethrough. Additionally, the cage portion 146 includes a bottom surface 148. The bottom surface 148 of the disclosed embodiment is generally ring-shaped and defines a seating surface 152.

With the components of the valve 100 configured as described, the control element is movable with the valve body 12 between a first seated position, where the bottom surface 134b of the cap 134 of the valve plug 126 sealingly engages the seating surface 129 of the seat ring 128, and a second seated position, where the upper surface 134a of the cap 134 of the valve plug 126 sealingly engages the seating surface 152 on the cage portion 144 of the bonnet 116.

Therefore, during operation, the valve 100 including the valve body 12 optimizes the efficiency at which fluid converges into or diverges from the valve 100 by utilizing the rear rib 66 and the side ribs 68a, 68b to interrupt the circulation of fluid within the throat cavity 64, as described above with reference to the embodiment depicted in FIGS. 1, 2, and 2A.

Figure 4:
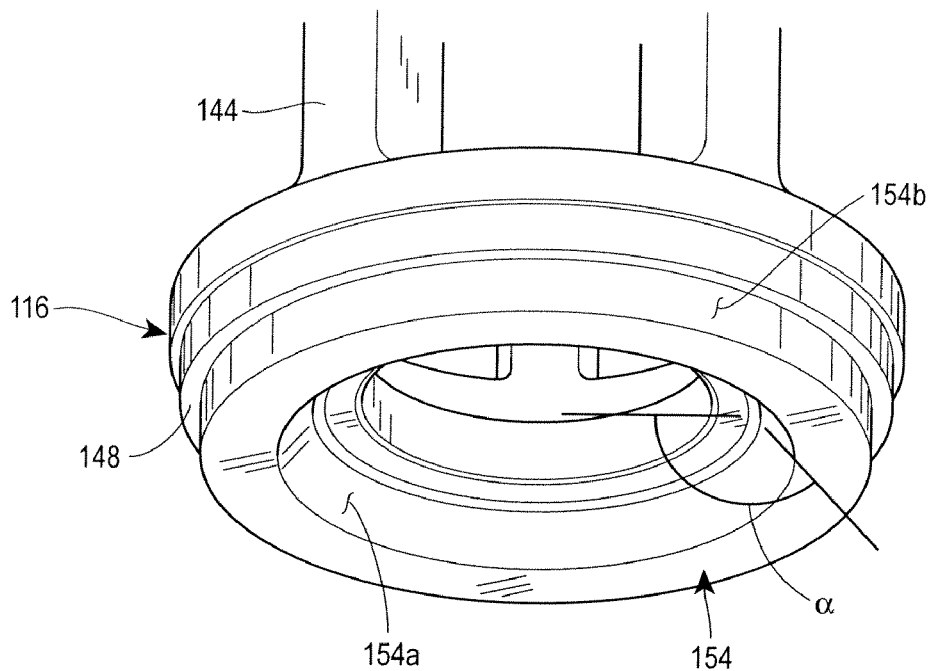
FIG. 4 is a partial perspective view of an upper valve seat of the unbalanced valve trim assembly of FIG. 3 including a ring-shaped protrusion.

Moreover, as illustrated in FIGS. 3 and 4, the cage portion 144 of the disclosed bonnet 116 includes a protrusion 154 extending from the bottom surface 148 thereof and into the throat cavity 64. The protrusion 154 includes a generally annular protrusion, which may also be referred to as a ring-shaped protrusion that is centered along the central axis A of the throat cavity 64. The protrusion 154 includes an inner surface 154a and an outer surface 154b. The outer surface 54b of the disclosed embodiment extends substantially perpendicular to the bottom surface 148 of the cage portion 144 of the bonnet 116. The inner surface 154a is generally cylindrical and extends at an angle α relative to the bottom surface 148 of the cage portion 144 of the bonnet 116. The angle α defines the inner surface 154a as a generally frustoconical surface that diverges away from the bottom surface 148 of the cage portion 144 of the bonnet 116. This geometry of the inner surface 154a can assist the flow of fluid into and out of the cage portion 144 of the bonnet 116 by acting as a deflector, for example, for fluid that may otherwise tend to circulate within the throat cavity 64 of the valve body 12.

Thus, the protrusion 154 depicted in FIGS. 3 and 4 effectively reduces the volume of the throat cavity 64, thereby reducing the volume of fluid capable of circulating therein. Accordingly, the protrusion 154 further increases the efficiency of the valve 100, alone, or in conjunction with the rear rib 66 and/or at least one of the side ribs 68a, 68b.

Figure 5:
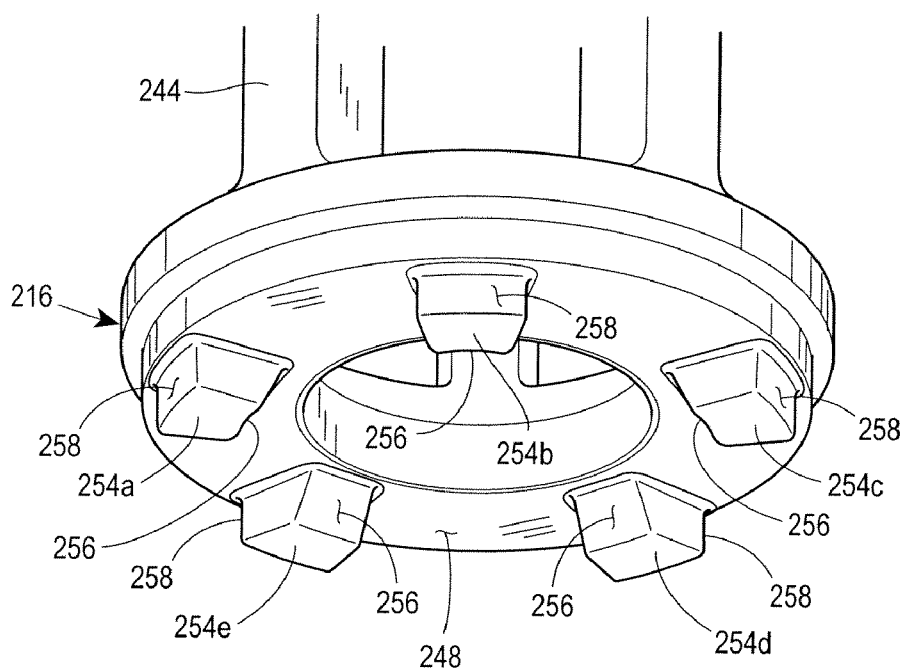
FIG. 5 is a partial perspective view of an alternative embodiment of the upper valve seat of the unbalanced valve trim assembly of FIG. 3 including a plurality of protrusions.

FIG. 5 depicts an alternative embodiment of a bonnet 216 for use with the valve 100 depicted in FIG. 3. The bonnet 216 includes a cage portion 244 that is generally identical to the cage portion 144 described with reference to FIGS. 3 and 4, but instead of a single annular protrusion 154, the bonnet 216 in FIG. 5 includes a plurality of protrusions 254a-254e circumferentially spaced about and extending from a bottom surface 248 of the cage portion 244 and into the throat cavity 64 of the valve body 12. Similar to the ring-shaped protrusion 154 described above, each of the plurality of protrusions 254a-254e includes an inner surface 256 and an outer surface 258. The outer surface 258 is partially cylindrical and disposed substantially perpendicular to the bottom surface 248 of the cage portion 244. The inner surface 256 is also partially cylindrical and extends from the bottom surface 248 of the cage portion 244 at an angle β.

Thus, similar to the ring-shaped protrusion 154 previously described, the plurality of protrusions 254a-254e reduce the volume of the throat cavity 64, thereby reducing the volume of fluid that can tend to circulate within the throat cavity 64, which can increase the efficiency at which fluid flows through the valve 100. Additionally, however, because the plurality of protrusions 254a-254e are circumferentially spaced about the bottom surface 248 of the cage portion 244, the protrusions 254a-254e can also interrupt the circulation of any fluid that does circulate within the throat cavity 64. Thus, the protrusions 254a-254e can complement the function of the rear rib 66 and the side ribs 68a, 68b described above, or can function independently of the rear rib 66 and the side ribs 68a, 68b.

In light of the foregoing, it should be appreciated that the embodiments and description provided herein are merely examples of the present invention and are not intended to limit the scope of the invention. Rather, the scope of the present invention is defined by the claims, and all subject matter within the spirit and scope of the claims is intended to be protected thereby.

What is claimed is:

1. A three-way valve body defining a fluid flow path, comprising:
 a first port, a second port, and a third port, each port in fluid communication with the flow path;
 a throat disposed between and in fluid communication with each of the first through third ports, the throat comprising a pair of opposing side wall portions, a rear wall portion, and an opening disposed opposite the rear wall portion, the throat defining a generally cylindrical throat cavity disposed along a central axis; and
 at least one flow diverter carried by the valve body and extending into the throat cavity to interrupt the flow of fluid along the flow path and in the throat cavity, the at least one flow diverter comprising at least one rib disposed on at least one of the side wall portions or the rear wall portion of the throat.

2. The device of claim 1, wherein the at least one flow diverter comprises one of:
 a first flow diverter comprising a first rib disposed on the rear wall portion of the throat and being disposed substantially parallel to the central axis of the throat cavity, and
 a second flow diverter comprising a pair of second ribs, each second rib disposed on one of the opposing sidewall portions of the throat and being disposed substantially parallel to the central axis of the throat cavity.

3. The device of claim 2, wherein the valve body comprises the first flow diverter and the second flow diverter.

4. The fluid flow control device of claim 3, wherein the second ribs of the second flow diverter are disposed a first distance from the first rib of the first flow diverter and a second distance from the opening in the throat, the first distance is greater than the second distance.

5. The device of claim 4, wherein each of the second ribs of the second flow diverter comprises a generally triangular cross-section.

6. The device of claim 4, wherein each of the second ribs of the second flow diverter comprises a first surface and a second surface meeting the first surface at an apex, each of the first and second surfaces comprising a concave surface.

7. The device of claim 1, wherein the throat of the valve body is adapted to interchangeably accommodate a balanced trim assembly to define a bottom port common valve and an unbalanced trim assembly to define a side port common valve.

8. The device of claim 1, wherein the at least one flow diverter increases the flow efficiency of the three-way valve body.

9. A three-way fluid flow control device, comprising:
 a valve body defining a flow path for accommodating one of a converging or a diverging fluid flow;
 a control element comprising a valve stem and a valve plug disposed within the valve body and adapted to be moved between a first seated position and a second seated position for controlling the flow of fluid along the flow path; and
 a first valve seat carried within the valve body and adapted to be sealingly engaged by the valve plug of the control element when the control element is in the first seated position, wherein the valve body comprises:
  a first port, a second port, and a third port, each port in fluid communication with the flow path;
  a throat disposed between and in fluid communication with each of the first through third ports, the throat comprising a pair of opposing side wall portions, a rear wall portion, and an opening disposed opposite the rear wall portion, the throat defining a generally cylindrical throat cavity disposed along a central axis, the throat cavity at least partly accommodating the control element; and
  at least one flow diverter carried by the valve body and extending into the throat cavity to interrupt the flow of fluid along the flow path and in the throat cavity, the at least one flow diverter selected from the group consisting of:
   a first rib disposed on the rear wall portion of the throat and being disposed substantially parallel to the central axis of the throat cavity, and
   a pair of second ribs, each second rib disposed on one of the opposing sidewall portions of the throat and being disposed substantially parallel to the central axis of the throat cavity.

10. The device of claim 9, wherein the at least one flow diverter increases the flow efficiency of the three-way fluid flow control device.

11. The device of claim 9, wherein the at least one flow diverter comprises the first rib and the pair of second ribs.

12. The device of claim 11, wherein the second ribs are disposed a first distance from the first rib and a second distance from the opening in the throat, the first distance being greater than the second distance.

13. The device of claim 12, wherein each of the second ribs comprises a generally triangular cross-section.

14. The device of claim 12, wherein each of the second ribs comprises a first surface and a second surface meeting the first surface at an apex, each of the first and second surfaces comprising a concave surface.

15. The device of claim 9, wherein the valve plug comprises a balanced valve plug having a tubular member and a plurality of webs connecting the tubular member to the valve stem.

16. The device of claim 15, further comprising:
 a valve cage disposed within the throat of the valve body, the valve cage carrying the first valve seat and slidably accommodating the valve plug; and
 a bonnet fixed to the valve body, the bonnet comprising a body extending into the flow path, the body having a parabolically-shaped cross-section and defining an external surface adapted to be sealingly engaged by the control element when the control element is in the open position.

17. The device of claim 9, wherein the valve plug comprises an unbalanced valve plug comprising a cap and a tubular member extending from the cap.

18. The device of claim 17, wherein the cap of the valve plug comprises a parabolically-shaped cross-section.

19. The device of claim 17, wherein the tubular member comprises a plurality of windows for controlling fluid flow along the flow path at least when the valve plug is in the second seated position.

20. The device of claim 17, further comprising a bonnet fixed to the valve body and comprising a cage portion extending into the flow path, the cage portion defining an internal cylindrical surface, a plurality of windows in fluid communication with the flow path, and a ring-shaped bottom surface disposed opposite the throat cavity from the first valve seat, the valve plug adapted to sealingly engage a portion of the cage portion that is located between the inner cylindrical surface and the bottom ring-shaped surface when the control element is in the second seated position.

21. The device of claim 20, further comprising a protrusion disposed on the bottom ring-shaped surface of the cage portion of the bonnet and extending into the throat cavity for at least decreasing the volume of the throat cavity of the valve body.

22. The device of claim 21, wherein the protrusion comprises an annular ring.

23. The device of claim 21, wherein the protrusion comprises plurality of protrusions circumferentially spaced about the bottom ring-shaped surface, the plurality of protrusions additionally for disrupting the flow of fluid along the flow path.

* * * * *

UNITED STATES PATENT AND TRADEMARK OFFICE
CERTIFICATE OF CORRECTION

| | | |
|---|---|---|
| PATENT NO. | : 8,122,908 B2 | Page 1 of 1 |
| APPLICATION NO. | : 12/034117 | |
| DATED | : February 28, 2012 | |
| INVENTOR(S) | : William E. Wears et al. | |

It is certified that error appears in the above-identified patent and that said Letters Patent is hereby corrected as shown below:

In the Specification:

At Column 3, line 54, "comprise" should be -- comprises --.

Signed and Sealed this
Twenty-fifth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 8,122,908 B2                                        Page 1 of 1
APPLICATION NO.   : 12/034117
DATED             : February 28, 2012
INVENTOR(S)       : William E. Wears et al.

It is certified that error appears in the above-identified patent and that said Letters Patent is hereby corrected as shown below:

In the claims,

In Column 9, lines 2-3, claim 16, "open position" should be "second seated position".

Signed and Sealed this
Ninth Day of February, 2016

Michelle K. Lee
*Director of the United States Patent and Trademark Office*